(12) United States Patent
Perricone et al.

(10) Patent No.: US 12,035,454 B2
(45) Date of Patent: *Jul. 9, 2024

(54) PLASMA ENGINE USING ION EXTRACTION

(71) Applicant: PerriQuest Defense Research Enterprises, LLC, Meriden, CT (US)

(72) Inventors: Nicholas V. Perricone, Meriden, CT (US); Kurt Rauschenbach, Franconia, NH (US); Matthew Partlow, Townsend, WA (US)

(73) Assignee: PerriQuest Defense Research Enterprises, LLC, Meriden, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,712

(22) Filed: Oct. 28, 2022

(65) Prior Publication Data

US 2023/0403780 A1 Dec. 14, 2023

Related U.S. Application Data

(63) Continuation of application No. 17/739,124, filed on May 8, 2022, now Pat. No. 11,510,307.

(60) Provisional application No. 63/215,482, filed on Jun. 27, 2021, provisional application No. 63/186,095, filed on May 8, 2021.

(51) Int. Cl.
*H05H 1/24* (2006.01)
*B64D 27/24* (2024.01)

(52) U.S. Cl.
CPC ........... *H05H 1/2406* (2013.01); *B64D 27/24* (2013.01)

(58) Field of Classification Search
None
See application file for complete search history.

(56) References Cited

U.S. PATENT DOCUMENTS

| 5,776,553 A | 7/1998 | Jaffe et al. | |
| 7,309,961 B2 * | 12/2007 | Park | H05H 1/54 |
| | | | 315/111.21 |
| 8,513,583 B2 * | 8/2013 | Corke | G02B 5/10 |
| | | | 250/201.9 |

(Continued)

FOREIGN PATENT DOCUMENTS

| WO | 2005/096317 A1 | 10/2005 |
| WO | 2022/240706 A1 | 11/2022 |

OTHER PUBLICATIONS

Penkov et al., "A Review of Recent Applications of Atmospheric Pressure Plasma Jets for Materials Processing", Journal of Coatings Technology and Research, vol. 12, Jan. 2015, pp. 225-235.

(Continued)

*Primary Examiner* — Srinivas Sathiraju
(74) *Attorney, Agent, or Firm* — Rauschenbach Patent Law Group, PLLC; Kurt Rauschenbach

(57) ABSTRACT

A plasma engine includes a plasma source having a gas input for receiving a first molecular gas species and that generates ions at an output from the received first molecular gas species. An ion extractor positioned proximate to the output of the plasma source extracts ions from the plasma source with an electric field. A housing includes a region that receives ions extracted from the ion extractor, wherein at least some of the extracted ions react with a second molecular gas species present in the housing to generate thrust.

32 Claims, 3 Drawing Sheets

(56) References Cited

U.S. PATENT DOCUMENTS

| | | | |
|---|---|---|---|
| 8,635,850 B1 | 1/2014 | Light et al. | |
| 8,663,751 B2* | 3/2014 | Dubreuil | C23C 16/4486 |
| | | | 427/248.1 |
| 9,137,883 B2* | 9/2015 | Sauti | H05H 1/2441 |
| 9,242,747 B1 | 1/2016 | Burton et al. | |
| 9,589,775 B2* | 3/2017 | Perelman | H01J 49/00 |
| 9,951,800 B2* | 4/2018 | Segawa | B60L 5/20 |
| 9,975,625 B2* | 5/2018 | Silkey | H05H 1/2439 |
| 10,356,888 B1* | 7/2019 | Nikmaram | H05H 1/2406 |
| 10,446,373 B2* | 10/2019 | Zimmerman | H05H 1/50 |
| 10,827,598 B2* | 11/2020 | Vioel | H05H 1/2418 |
| 11,078,794 B2* | 8/2021 | Asaumi | H05H 1/2439 |
| 11,149,370 B2* | 10/2021 | Cornelius | D06B 19/007 |
| 11,214,359 B2* | 1/2022 | Kikuchi | B64C 13/50 |
| 11,266,003 B2* | 3/2022 | Mujahid | H05H 1/2406 |
| 11,310,900 B2* | 4/2022 | Calomeris | H01G 4/018 |
| 11,352,696 B2* | 6/2022 | Creyghton | H01J 37/32366 |
| 11,510,307 B1* | 11/2022 | Perricone | F03H 1/0006 |
| 2006/0131282 A1 | 6/2006 | Miller et al. | |
| 2008/0169763 A1* | 7/2008 | Burke | B03C 3/41 |
| | | | 315/111.21 |
| 2008/0283411 A1* | 11/2008 | Eastman | C10G 2/30 |
| | | | 205/343 |
| 2009/0309046 A1* | 12/2009 | Balakin | H05H 13/04 |
| | | | 378/65 |
| 2010/0059687 A1* | 3/2010 | Balakin | H05H 13/04 |
| | | | 250/492.3 |
| 2010/0090122 A1* | 4/2010 | Balakin | A61N 5/10 |
| | | | 250/424 |
| 2010/0127624 A1* | 5/2010 | Roy | H05H 1/2406 |
| | | | 315/111.21 |
| 2011/0018444 A1* | 1/2011 | Pouvesle | H05H 1/2406 |
| | | | 315/111.21 |
| 2011/0048251 A1* | 3/2011 | Bardenshtein | H01J 37/32321 |
| | | | 426/240 |
| 2011/0313232 A1* | 12/2011 | Balakin | A61N 5/1081 |
| | | | 315/503 |
| 2014/0144517 A1* | 5/2014 | Raja | B64C 23/005 |
| | | | 422/186.21 |
| 2015/0267727 A1* | 9/2015 | Segawa | F04D 29/681 |
| | | | 313/231.31 |
| 2016/0035550 A1* | 2/2016 | Perelman | H01J 49/00 |
| | | | 250/288 |
| 2018/0051679 A1 | 2/2018 | Khachan et al. | |
| 2019/0193863 A1* | 6/2019 | Abdollahzadehsangroudi | |
| | | | B64D 15/20 |
| 2019/0246482 A1* | 8/2019 | Zimmerman | H01J 37/32568 |
| 2020/0217310 A9* | 7/2020 | Calomeris | H01B 3/00 |
| 2020/0288561 A1* | 9/2020 | Huh | H01J 37/32146 |
| 2020/0386213 A1* | 12/2020 | Barrett | B64C 23/005 |
| 2022/0361312 A1* | 11/2022 | Perricone | B64D 27/24 |
| 2023/0403780 A1* | 12/2023 | Perricone | B64D 27/24 |

OTHER PUBLICATIONS

Pipa et al., "The Equivalent Circuit Approach for the Electrical Diagnostics of Dielectric Barrier Discharges: The Classical Theory and Recent Developments", Atoms, vol. 7, No. 14, 2019, 19 pages.
Reuter et al., "The kINPen—a Review on Physics and Chemistry of the Atmospheric Pressure Plasma Jet and its Applications", Journal of Physics D: Applied Physics, vol. 51, 2018, 51 pages.
Sabdenov, K.O, "Effect of Chemical Work on the Flame Temperature and Burning Rate of an H2/O2 Mixture", Combustion, Explosion, and Shock Waves, vol. 57, No. 2, 2021, pp. 171-181.
Sato et al., "Successively Accelerated Ionic Wind With Integrated Dielectric-Barrier-discharge Plasma Actuator For Low-voltage Operation", Scientific Reports, vol. 9, No. 5813, 2019, 11 pages.
Schutze et al., "The Atmospheric-Pressure Plasma Jet: A Review and Comparison to Other Plasma Sources", IEEE Transactions on Plasma Science, vol. 26, No. 6. Dec. 1998, pp. 1685-1694.
Shcherbanev et al., "Dielectric Barrier Discharge for Multi-Point Plasma-Assisted Ignition at High Pressures", Aug. 13, vol. 373, No. 2048, 2015, 12 pages.
Singh et al., "Introduction to Plasma Based Propulsion System: Hall Thrusters", IntechOpen, 2021, 10 pages.
Sjøgren et al., "Hydrogen Plasma Reactions in a D.C. Mode for the Conservation of Iron Meteorites and Antiquities", Studies in Conservation, vol. 36, No. 3, Aug. 1991, pp. 161-171.
Sosa et al., "Experimental Evidence of H2/O2 Propellants Powered Rotating Detonation Waves", Combustion and Flame, vol. 214, Apr. 2020, 10 pages.
Starikovskiy et al., "Plasma-Assisted Ignition and Combustion", Progress in Energy and Combustion Science, vol. 39, 2013, pp. 61-110.
Starikovskiy et al., "Plasma-Assisted Ignition and Deflagration-to-Detonation Transition", Philosophical Transactions of the Royal Society A, vol. 370, 2012, pp. 740-773.
St-Onge et al., "Hydrogen Atom Yield in RF and Microwave Hydrogen Discharges", Plasma Chemistry and Plasma Processing, vol. 14, No. 2, 1994, pp. 87-116.
Teschke et al., "High-Speed Photographs of a Dielectric Barrier Atmospheric Pressure Plasma Jet", IEEE Transactions on Plasma Science, vol. 33, No. 2, Apr. 2005, pp. 310-311.
Tian et al., "Optical Characterization of Miniature Flexible Micro-Tube Plasma (FμTP) Ionization Source: A Dielectric Guided Discharge", Spectrochimica Acta Part B, vol. 181, 2021, 9 pages.
Vernet et al. "Flow Separation Control by Dielectric Barrier Discharge Plasma Actuation Via Pulsed Momentum Injection", AIP Advances, vol. 8, 2018, pp. 075229-1-075229-19.
Vizcaino, Jeff, "Investigation of Pulse Detonation Engines; Theory, Design and Analysis", Master of Science in Aerospace Engineering, 2013, 270 pages.
Wang et al., "Effect of Equivalence Ratio on the Velocity of Rotating Detonation", International Journal of Hydrogen Energy, vol. 40, 2015, pp. 7949-7955.
Wang et al., "Measurement of Atomic Hydrogen Density in Non-Thermal H2 Plasmas via Threshold Ionisation-Molecular Beam Mass Spectrometry", The European Physical Journal D, vol. 50, 2008, pp. 257-264.
Wilde et al., "A Model of Surface Dielectric Barrier Discharge Power", Applied Physics Letters, vol. 118, No. 154102, 2021, pp. 154102-1-154102-7.
Wilson et al., "Summary of Recent Research on Detonation Wave Engines at UTA", International Workshop on Detonation for Propulsion, 2011, 28 pages.
Winter et al., "Atmospheric Pressure Plasma Jets: An Overview of Devices and New Directions", Plasma Sources Science and Technology, vol. 24, 2015, 19 pages.
Wright et al., "Comment on "Jet Propulsion by Microwave Air Plasma in the Atmosphere"", AIP Advances, vol. 10, 2020, pp. 099101-1-099101-4.
Wu et al., "Atmospheric Pressure Self-Organized Filaments in Dielectric Barrier Discharge Excited by a Modulated Sinusoidal Voltage", Physics of Plasmas, vol. 27, No. 082308, 2020, pp. 082308-1-082308-7.
Xie et al., "Review on the Rotating Detonation Engine and Its Typical Problems", vol. 4, No. 261, 2020, pp. 107-163.
Xu et al., "A Dielectric Barrier Discharge ion Source Increases Thrust and Efficiency of Electroaerodynamic ", Propulsion, Applied Physics Letters, vol. 114, No. 254105, 2019, pp. 254105-1-254105-5.
Xu et al., "Flight of an Aeroplane with Solid-State Propulsion", Nature, vol. 563, Nov. 22, 2018, 8 pages.
Xu et al.m "Electrical Characteristics of Wire-to-Wire Dielectric Barrier Discharges", Plasma Sources of Science Technology, vol. 30, 2021, 8 pages.
Yang et al., "Treatment of Phenol Wastewater Using Hydroxyl Radical Produced by Micro-Gap Discharge Plasma Technique", Water Environment Research, vol. 81, No. 4, Apr. 2009, pp. 450-455.
Yau et al., "Ionization in a Dense Hydrogen Plasma: Analytic Solution of the Master Equation", Proceedings of the Royal Society of London, vol. 362, No. 1708, Jun. 30, 1978, pp. 113-127.

(56) References Cited

OTHER PUBLICATIONS

Ye et al., "Jet Propulsion by Microwave Air Plasma in the Atmosphere", AIP Advances, vol. 10, 2020, pp. 055002-1-055002-4.
Ye et al., "Response to Comment on Jet Propulsion by Microwave Air Plasma in the Atmosphere", AIP Advances, vol. 10, 2020, pp. 099101-1-099101-2.
Yue et al., "Absolute Atomic Hydrogen Density Measurements in an Atmospheric Pressure Plasma Jet: Generation, Transport and Recombination from the Active Discharge Region to the Effluent", Plasma Sources Science and Technology, vol. 29, 2020, 5 pages.
Zahoranova et al., "Prebreakdown Positive Corona Streamers and the Streamer-Cathode Contact in Hydrogen", Czechoslovak Journal of Ohysics, vol. 49, No. 6, 1999, pp. 941-956.
Zhang et al., "Experimental Investigations on H2/air Rotating Detonation Wave in the Hollow Chamber with Laval Nozzle", International Journal of Hydrogen Energy, vol. 42, 2017, pp. 3363-3370.
Zhang et al., "Low Voltage Control of Micro-Ionic Thrusters Using the Electrostatic Induced Potential of the Collector", IEEE Robotics and Automation Letters, vol. 6, No. 4, Oct. 2021, pp. 6884-6890.
Zhou et al., "Study of Plasma-Assisted Detonation Initiation by Quasi-Direct Current Discharge", International Journal of Spray and Combustion Dynamics, vol. 12(I), 2020, pp. 1-8.
Abdelaziz et al., "Unveiling the Formation and Control of Unique Swirling Discharge Pattern in Helium Plasma Candle Device", Journal of Physics D: Applied Physics, vol. 55, 2022, 13 pages.
Barman et al., Characteristics of Atmospheric Pressure Micro-Plasma Jets in two Different Modes of Excitation Depending Upon Wave Amplitude and Frequency, Plasma Research Express, vol. 2, 2020, 15 pages.
Becker et al., "Tropical Review : Microplasmas and Applications", Journal of Applied Physics, vol. 39, 2006, pp. R55-R70.
Boeuf et al., "Dynamics of a Guided Streamer ('plasma bullet') in a Helium Jet in Air at Atmospheric Pressure", Journal of Physics D: Applied Physics, vol. 46, 2013, 13 pages. Dielectric Barrier Discharges: Progress on Plasma Sources and on the Filaments, Plasma Sources of Science Technology, vol. 27, 2018, 30 pages.
Brandenburg, Ronny "Corrigendum: Dielectric Barrier Discharges: Progress on Plasma Sources and on the Understanding of Regimes and Single Filaments", Plasma Sources of Science Technology, vol. 27, 2018, 30 pages.
Bruggeman et al. "Atmospheric Pressure Discharge Filaments and Microplasmas: Physics, Chemistry and Diagnostics", Journal of Physics D, vol. 46, 2013, 28 pages.
Christenson et al., "Ion-Neutral Propulsion in Atmospheric Media", AIAA Journal, vol. 5, Oct. 1967, pp. 1768-1773.
Drew et al., "First Takeoff of a Flying Microrobot With No Moving Parts", IEEE, 2017, 5 pages.
Ebeling et al., "Hydrogen Plasma—Phase Diagram and Properties", Europhysics New, vol. 17, No. 4, 1986, pp. 52-55.
Fadone et al., "Plasma Characterization of a Hall Effect Thruster for a Negative Ion Source Concept", AIP Conference Proceedings 2052, 2018, pp. 020009-1-020009-8.
Farouk et al., "Modeling of Direct Current Micro-Plasma Discharges in Atmospheric Pressure Hydrogen", Plasma Sources Science and Technology, vol. 16, Jul. 2007, pp. 619-634.
Gershman et al., "A Low Power Flexible Dielectric Barrier Discharge Disinfects Surfaces and Improves the Action of Hydrogen Peroxide", Scientific Reports, vol. 11, 2021, 12 pages.
Gibbon, P., "Introduction to Plasma Physics", CERN, vol. 1, 2016, pp. 51-65.
Gilmore et al., "Electrohydrodynamic Thrust Density Using Positive Corona-Induced Ionic Winds for In-Atmosphere Propulsion", Proceedings: Mathematical, Physical and Engineering Sciences, vol. 471, No. 2175, Mar. 8, 2015, pp. 1-24.
Gomez-Vega, "Performance of Decoupled Electroaerodynamic Thrusters", Applied Physics Letters, vol. 118, 2021, pp. 074101-1-074101-6.
Goodwin, D.G., "Scaling Laws for Diamond Chemical—Vapor Deposition. II. Atomic hydrogen transport", Journal of Applied Physics, vol. 74, 1993, pp. 6895-6906.
Goto et al., "Thrust Validation of Rotating Detonation Engine System by Moving Rocket Sled Test", Journal of Propulsion and Power, vol. 37, No. 3, 2021, pp. 419-425.
Grubbs, "Attenuation of hydrogen radicals traveling under flowing gas conditions through tubes of different materials", Journal of Vacuum Science & Technology A, vol. 24, Issue 3, 2006.
Ham et al., "Electronegative Microchannel Guided Streamer Propagation for In-Liquid Spark Breakdown Applications", Applied Physics Letters, vol. 118, 2021, pp. 103905-1-103905-5.
Heat Values of Various Fuels, Retrieved via: < https://world-nuclear.org/information-library/facts-and-figures/heat-values-of-various-fuels.aspx>, 2 pages.
Heating Values of Hydrogen and Fuels, 1 page.
Hogarth et al., "Internal Relaxation, Ionization and Recombination in a Dense Hydrogen Plasma. I.Application of Singular Perturbation Theory", Proceedings of the Royal Society of London, vol. 345, No. 1641, 1975. pp. 251-263.
Hogarth et al., "Internal Relaxation, Ionization and Recombination in a Dense Hydrogen Plasma. II.Population Distributions and Rate Coefficients", Proceedings of the Royal Society of London, vol. 345, No. 1641, 1975, pp. 265-276.
Horvatic et al., "Discussion of Fundamental Processes in Dielectric Barrier Discharges Used for Soft Ionization", Spectrochimica Acta Part B, vol. 100, 2014, pp. 52-61.
Johnsen, Rainer "Kinetic Processes in Recombining H3+ Plasmas", Philosophical Transactions of the Royal Society, vol. 370, Nov. 13, 2012, pp. 5109-5117.
Kawasaki et al., "Critical Condition of Inner Cylinder Radius for Sustaining Rotating Detonation Waves in Rotating Detonation Engine Thruster", Proceedings of the Combustion Institute, vol. 37, No. 3, 2019. pp. 3461-3469.
Keidar et al., "Fundamentals and Applications of Atmospheric Pressure Plasmas", Journal of Applied Physics, vol. 130, 2021, pp. 080401-1-080401-4.
Kettlitz et al., "Effect of a High-Voltage Mesh Electrode on the Volume and Surface Characteristics of Pulsed Dielectric Barrier Discharges", Journal of Applied Physics, vol. 128, 2020, pp. 233302-1-233302-13.
Kim et al., "Efficient Generation of Ozone in Arrays of Microchannel Plasmas", Journal of Physics D: Applied Physics, vol. 46, 2013, 9 pages.
Kogelschatz, U. "Collective Phenomena in Volume and Surface Barrier Discharges", Journal of Physics Conference Series, vol. 257, 2010, 12 pages.
Korzec et al., "Atmospheric Pressure Plasma Jet Powered by Piezoelectric Direct Discharge", Plasma Processes and Polymers, 2020, 14 pages.
Korzec et al., "Piezoelectric Direct Discharge: Devices and Applications", Plasma, vol. 4, 2021, pp. 1-41.
Kuraica et al., "Application Of Coaxial Dielectric Barrier Discharge For Potable And Waste Water Treatment", Jan. 2004, 10 pages.
Laimer et al., "Plasma Sheath Dynamics in Dielectric Barrier-Free Atmospheric Pressure Radio-Frequency Glow Discharges", Plasma Processes and Polymers, vol. 6, 2009, pp. S253-S257.
Larkin, F.S., "Homogeneous Rate of Recombination of Hydrogen Atoms", Jun. 8, 1967, 12 pages.
Laroussi et al., "Arc-Free Atmospheric Pressure Cold Plasma Jets: A Review", Plasma Processes and Polymers, vol. 4, 2007, pp. 777-788.
Laroussi et al., "Room-temperature atmospheric pressure plasma plume for biomedical applications", Appl. Phys. Lett. vol. 87, No. 113902, 2005.
Li et al., "Influence of Equivalence Ratio on the Propagation Characteristics of Rotating Detonation Wave", Experimental Thermal and Fluid Science, vol. 93, May 2018, 19 pages.
Lu et al., "On Atmospheric-Pressure Non-Equilibrium Plasma Jets and Plasma Bullets", Plasma Sources Science and Technology, vol. 21, 2012, 17 pages.

(56) References Cited

OTHER PUBLICATIONS

Lu et al., "Reactive Species in Non-Equilibrium Atmospheric-Pressure Plasmas: Generation, Transport, and Biological Effects", Physics Report, vol. 630, 2016, pp. 1-84.

Masuyama et al., "On the Performance of Electrohydrodynamic Propulsion", Proceedings of the Royal Society, 2013, 16 pages.

Mueller et al., "Development of Plasma Assisted Active Control for Rotating Detonation Engines", Department of Mechanical and Aerospace Engineering, 2021, 129 pages.

Nagaraja et al., "Ignition of Hydrogen-Air Mixtures Using Pulsed Nanosecond Dielectric Barrier Plasma Discharges in Plane-to-Plane Geometry", Combustion and Flame, vol. 161, 2014, pp. 1026-1037.

Nijdam et al., "The Physics of Streamer Discharge Phenomena", Plasma Sources Science and Technology, vol. 29, 2020, 49 pages.

Nishime et al., "A Coaxial Dielectric Barrier Discharge Reactor for Treatment of Winter Wheat Seeds", Applied Sciences, vol. 10, No. 7133, 2020, 19 pages.

Nudnova et al., "Fast Gas Heating in $N_2/O_2$ Mixtures Under Nanosecond Surface Dielectric Barrier Discharge: The Effects of Gas Pressure and Composition", Philosophical Transactions: Mathematical, Physical and Engineering Sciences, vol. 373, No. 2048, Aug. 13, 2015, pp. 1-13.

Opaits, Dimitry F., "Dielectric Barrier Discharge Plasma Actuator for Flow Control", NASA/CR, 2012, 162 pages.

Pai et al., "Surface Dielectric Barrier Discharges Exhibiting Field Emission at High Pressures", Plasma Sources Science and Technology, vol. 23, 2014, 16 pages.

Patscheider et al., "Application of Low-Pressure Hydrogen Plasma to the Conservation of Ancient Iron Artifacts", Studies in Conservation, vol. 31, No. 1, Feb. 1986, pp. 29-37.

Peeters et al., "The Influence of Partial Surface Discharging on The Electrical Characterization of DBDs", Plasma Sources Science and Technology, vol. 24, 2015, 9 pages.

International Preliminary Report on Patentability received for corresponding PCT Application No. PCT/US2022/028241 mailed on Nov. 23, 2023, 10 pages.

* cited by examiner

PLASMA ENGINE USING ION EXTRACTION

CROSS REFERENCE TO RELATED APPLICATIONS

The present application is a continuation application of U.S. patent application Ser. No. 17/739,124, entitled "Plasma Engine using Reactive Species", filed on May 8, 2022, which is a non-provisional application of U.S. Provisional Patent Application No. 63/186,095, entitled "Electroaerodynamic Engine" filed on May 8, 2021 and also a non-provisional application of U.S. Provisional Patent Application No. 63/215,482, entitled "Electroaerodynamic Engine" filed on Jun. 27, 2021. The entire contents of U.S. patent application Ser. No. 17/739,124, and U.S. Provisional Patent Application Nos. 63/186,095 and 63/215,482 are all herein incorporated by reference.

The section headings used herein are for organizational purposes only and should not be construed as limiting the subject matter described in the present application in any way.

INTRODUCTION

Recent research on electroaerodynamic (EAD) engines by a research group in the Department of Aeronautics and Astronautics, Massachusetts Institute of Technology (MIT), Cambridge, Massachusetts has garnered much attention by the popular press for describing a two-stage ion engine that separates ionization and acceleration processes, which can produce more thrust at a higher thrust-to-power than known ion engines. The research gained attention because of the promise of electrical ion-propulsion as a clean alternative to conventional aircraft propulsion engines.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

DESCRIPTION OF VARIOUS EMBODIMENTS

Figure 1:
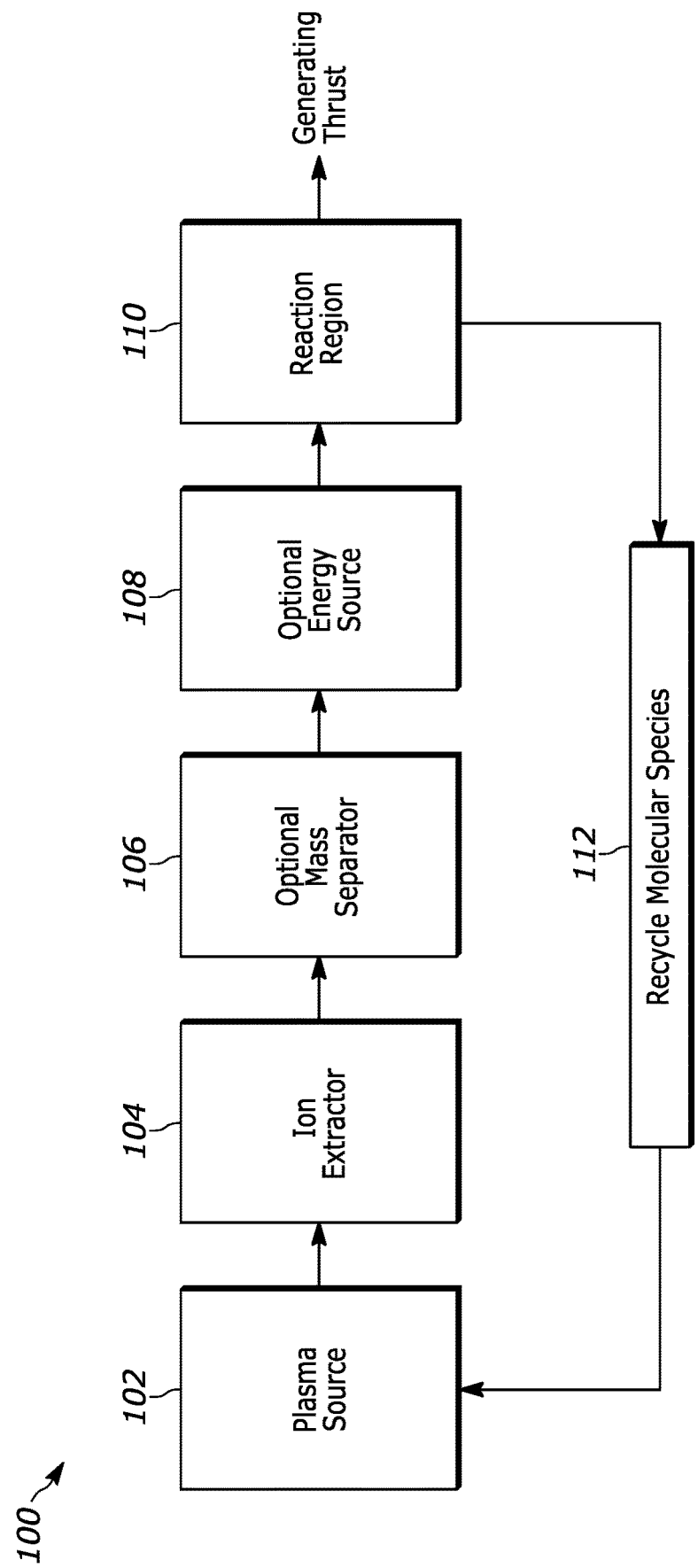
FIG. 1 schematically illustrates a block diagram of a multi-stage plasma engine according to the present teaching.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

Ion engines have been of interest for many years and have been used successfully in small spacecraft, for example satellite and space probes. However, ion engines are very limited because their powers are very low. In particular, for earth-based aircraft, the thrust-to-power ratio of ion engines is particularly low making them impractical. While heavier than air flight using ion engines has been shown for toy-size aircraft using state-of-the-art ion engines, the power levels and, in particular, thrust-to-power ratios are still many orders of magnitude below that needed for practical human flight.

Electroaerodynamic (EAD) propulsion, which produces a thrust force by electrostatic means, has been proposed as a method of electric airplane propulsion. The advantage is that it is a solid-state design with no moving parts that is nearly silent. Most importantly, it produces no combustion emissions during operation.

Many known EAD propulsion devices use a direct current (DC) corona discharge to produce ions and the same DC field to accelerate them. However, these corona discharge EAD devices are subject to a performance trade-off where increasing thrust reduces efficiency making the thrust-to-power ratio low. Recently, one group of researchers used a dielectric barrier discharge (DBD) instead of a corona discharge to produce ions in combination with a DC field to accelerate the ions. See, "A Dielectric Barrier Discharge Ion Source Increases Thrust and Efficiency of Electroaerodynamic Propulsion", Appl. Phys. Lett. 114, 254105 (2019).

Such a configuration is considered to be a "decoupled" EAD device, where ions are produced in an independent first stage and then accelerated in independent second stage. A decoupled thruster in theory can produce more current, which can result in a higher thrust-to-power ratio, when compared to a corona discharge thruster with the same geometry and at the same applied voltage. However, the EAD propulsion device with decoupled ion generation and ion acceleration still has a thrust-to-power ratio that is fundamentally limited to levels that are impractical for essentially all applications.

More recently, researchers at Wuhan University Institute of Technological Sciences proposed and demonstrated a ground-based prototype of a propulsion thruster that utilizes air plasma induced by microwave ionization that only uses air and electricity to produce high temperature and pressurized plasma for jet propulsion. See, "Jet Propulsion by Microwave Air Plasma in the Atmosphere", AIP Advances 10, 055002 (2020). This thruster uses a high-power microwave source, an industrial cooler, an air compressor, and an RF power source that together form a plasma torch that was shown to produce thrust.

However, such a design is complex and includes many components, as well as at least four electrical power sources used to supply power to components, such as a high-power magnetron, industrial water cooler, air compressor, and RF plasma source. Furthermore, microwave generators are notoriously inefficient. Microwave generators typical have an overall efficiency of only about 50% (AC line to microwave power). In addition, the magnetron tubes in microwave generators typically need to be replaced on a routine basis, which significantly adds to the operating cost and down time. In addition, specialized and costly waveguide components are needed to couple the power from the microwave generator to the plasma. The microwave coupling components and generator are also physically large in size. In addition to the large physical size, many components and the overcall complexity, the combined weight of all the components is enormously large compared to the thrust that can possibly be generated with such a system. Consequently, it does not appear that the thrust-to-weight ratio of such a design could ever be practical human flight or even ground vehicles.

The present teachings relate to more generally to plasma engines that can be considered in some modes of operation to be EAD engines that are multi-stage engines that includes a plurality of independent stages that can each be independently optimized. Furthermore, each of the stages can take many different forms and many configurations depending upon the application and on the technical requirements.

One aspect of the plasma engine of the present teaching is that recombination of atomic species of a feed gas such as hydrogen, helium and other inert gases, is used to generate heat that creates thrust. In some configurations, the feed gases such as hydrogen and helium are mixed with air in an atmospheric pressure environment and ionized to generate atomic species. For example, hydrogen can be diluted with air so that it is below an explosive concentration. In some methods, the percentage of hydrogen is maintained in the range of 2-4%. A suitable gas sensor can be used in a feedback loop with a control valve to meters the hydrogen or other gas supplied to the ion engine in order to maintain a desired percentage of hydrogen or other gasses. The control valve can be a mass flow controller to more precisely control the concentration of particular gases.

The amount of air and/or the concentration of species, such as hydrogen can be changed depending upon the ambient conditions including altitude allowing the plasma engine to optimize performance metrics based on environmental conditions. One aspect of the plasma engine of present teaching is that it can be used to generate thrust in a wide range of atmospheric pressures making it suitable for ground based vehicles as well as aircraft and spacecraft.

However, in other configurations, a high concentration of feed gas such as hydrogen and helium is used to generate atomic species before the atomic species are released into an atmospheric environment.

Another aspect of the plasma engine of present teaching is that pulsed plasma technology is used to generate thrust that forms a shock wave. Yet another aspect of the plasma engine of the present teaching is that recombined atomic species can be recirculated back to the ion source to improve the overall efficiency of the engine and to reduce the weight requirements for fuel necessary for practical transportation.

These and other aspects of the present teaching are referred to in the industry as PerriQuest Pulsed Plasma Propulsion or PerriQuest P3 Technology™.

FIG. 1 schematically illustrates a block diagram of a multi-stage plasma engine 100 according to the present teaching. This design of ion engine has the potential to overcomes thrust-to-power ratio and thrust-to-weight ratio limitations of known plasma engines, which have rendered them impractical for most applications. The first stage of many plasma engines according to the present teaching includes an ion source. The hybrid multi-stage ion engine 100 includes a plasma source 102 that generates ions and, in some methods, atomic species. Some methods the plasma ion source 102 generate ions of atomic species that can be extracted out of the ion source with an electric field. The plasma ion source 102 can be a single or a multi-stage plasma ion source. But, importantly, in many embodiments, the plasma ion source 102 is separate from other parts of the ion engine 100. That is, the plasma ion source 102 decouples the ion production and the ions extraction out of the ion source, thereby providing designers many more options for using different types of ion sources and ion extraction and ion accelerating means.

The plasma ion source 102 can be one or more of numerous types of plasma ion sources. For example, in one embodiment, the plasma ion source 102 is a dielectric barrier discharge ion source. The dielectric barrier discharge ion source typically includes a high-voltage electrode positioned on a dielectric material, which is known in the art as a dielectric barrier. A second electrode, which can be at ground potential, is positioned adjacent to the dielectric barrier. The space between the dielectric barrier and the ground electrode is typically called the discharge gap. A dielectric barrier discharge plasma source creates an electrical discharge between two electrodes that are separated by an insulating dielectric barrier.

The electrical discharge causes electrical breakdown of the gas between the electrodes thereby forming a plasma. When a gas is heated past a critical point, electrons are ripped away from the atoms with a process referred to as ionization and form a plasma. A plasma is often referred to as a "soup" of ions, which are positively charged particles and negatively charged particles which are electrons. Plasma is considered the fourth state of matter, and as such it comprises over 99% of the visible universe. The presence of charged particles, the ions and the electrons, is what sets plasma apart from other states of matter. The presence of charged particles allows for plasma to conduct electricity and be manipulated by electric and magnetic fields.

There are many possible configurations of the plasma ion source 100. For example, planar configurations have parallel plates and cylindrical with coaxial plates with a dielectric tube between the plates. In some configurations, the dielectric barrier discharge region comprises an asymmetrical electrode configuration that is configured to assist in the generation of thrust. In some configurations, the dielectric barrier discharge region is linear. In other configurations, the dielectric barrier discharge region circular-shaped or oval-shaped.

Dielectric barrier discharge ion sources can be powered by electromagnetic wave frequencies ranging from lower RF kilohertz range to microwave frequencies. In some configurations, the ion source is an array of dielectric barrier discharge regions. The array can be a linear array in a rectangular configuration. The array of dielectric barrier discharge regions can also be a circular array formed in one or more circular packing configuration. In one particular embodiment, the array of circular dielectric barrier discharge regions is arranged in a close-packed configuration of generally equal spheres in a dense arrangement that provides a high density of ion production.

In some configurations, there are performance and convenience advantages to constructing an array of an odd number of dielectric barrier discharge regions and in particular, an array of three, six, or nine dielectric barrier discharge regions. In other configurations, there are performance and convenience advantages to constructing an array of dielectric barrier regions with the total number of dielectric barrier regions according to certain mathematical expression. For example, the total number of dielectric barrier regions can be equal to a number that is the sum of two proceeding numbers in a series that represent some physical systems and features found in nature.

In some embodiments, the plasma source 102 is a dielectric barrier plasma source that is configured to generate a high fraction of atomic species in the plasma. Atomic species are used in the methods and apparatus of the present teaching because they can release a relatively large amount of energy when they recombine, which can be used for thrust.

Atomic species of hydrogen is particularly useful for this purpose. Hydrogen is most naturally in molecular form, $H_2$. The hydrogen molecule can be disassociated in a plasma into atomic hydrogen $H_2+e^- \rightarrow H+H$. The hydrogen molecule can then be ionized so that it can be transported out of the plasma source 102 with influence of an electric field to a separated reaction region. Methods of the present teaching can utilize two neutral species (H, $H_2$) and three positive ionic species ($H^+$, $H_2^+$, $H_3^+$). One type of hydrogen ionization is $H_2+e^- \rightarrow H_2^+ + 2e^-$. Another type of hydrogen ionization is $H+e^- \rightarrow H^+ + 2e^-$, where $H^+$ is actually just a proton. Another type of hydrogen ionization is $H_2^+ + e^- \rightarrow H^+ + H + e^-$. Yet another type of hydrogen ionization is $H_2^+ + H_2 \rightarrow H_3^+ + H$. Models have been developed to estimate concentrations of hydrogen atomic species generated from pure hydrogen in plasmas from. See, for example, L. St-Onge and M. Moisan, "Plasma Chemistry and Plasma Processing", Vol. 14. No. 2, 1994, which is incorporated herein by reference. Also, see T. Farouk, et al., Modeling of Direct Current Micro-Plasma Discharges in Atmospheric Pressure Hydrogen, Plasma Sources Science and Technology July 2007, which is incorporated herein by reference.

For the recombination process discussed herein, we mean two hydrogen atoms combining to form molecular hydrogen, i.e., $H+H \rightarrow H_2 + energy$ and/or when atomic hydrogen gains an electron, i.e., $H^+ + e^- \rightarrow H + energy$. It is known in the art that when hydrogen atoms combining to form molecular hydrogen, i.e., $H+H \rightarrow H_2$ 196,200 BTU/lb is released. This is almost four times the energy released with molecular hydrogen is combined with oxygen, which is 52,200 BTU/lb. For comparison, the highest quality gasoline (n-Heptane) produces only 19,314 BTU/lb.

Hydrogen molecules have relatively high binding energy (4.52 eV) and also high surface recombination coefficient (on the order of 0.002) so it is relatively difficult to generate atomic hydrogen from molecular hydrogen and then to transport it with overall high efficiency. However, these limitations can be at least partially overcome with the methods and apparatus of the present teaching. In particular, the use of dielectric barrier discharge plasma ion sources and other plasma sources described herein makes the generation of atomic hydrogen species at high pressure practical.

One advantage of dielectric barrier discharge plasma ion sources is that they can operate efficiently at atmospheric pressure as well as at reduced pressure that is experienced in typical flight conditions. That is, dielectric barrier plasma ion sources for plasma engine applications do not require the use of a vacuum pump to evacuate the region generating ions in the plasma. Dielectric barrier discharges can produce non-equilibrium atmospheric plasma at relatively low power. The terms non-equilibrium plasma, "cold plasma", and non-thermal plasma are all used in the art to denote a plasma where the electron temperature is much hotter than the temperature of heavy species. These "cold plasmas" are formed when high voltages send high-speed electrons through air or other gasses so that these electrons impact the outmost electrons of the atoms and molecules in the gas thereby forming a mixture of free electrons and free ions. These non-thermal plasmas are optimized to generate a higher fraction of atomic species because these plasmas can have high local plasma densities according to methods of the present teaching.

A high voltage alternating current (AC) generator includes an output that is electrically connected to the high voltage electrode and typically include a grounded that is electrically connected to the ground electrode.

In one configuration, an AC electric field can be generated orthogonal to the DC thrust-producing electric field. Typical applied high voltages are in the range of several to 10s of kilovolts with repetition rates in the kilohertz range. But, it should be understood that a wide range of driving voltage waveforms can be used in these ion sources.

In other embodiments, the plasma source 102 is a microwave plasma ion source. The plasma source can include a port configured to receive hydrogen gas so that hydrogen ions are generated from the hydrogen gas wherein at least some generated hydrogen ions are in an excited state creating atomic species. Microwave discharge sources are commonly used in semiconductor processing equipment and for many other applications. These sources operate at pressures ranging from less than $10^{-3}$ Torr to pressures greater than one atmosphere.

Importantly, microwave discharge plasma ion sources can also be used at atmospheric pressure and at reduced pressure that is experienced in typical flight conditions. That is, microwave plasma ion sources for plasma engine applications also do not require the use of a vacuum pump to evacuate the region generating the ions in the plasma.

In one particular embodiment, a toroidal microwave plasma source is used to generate ions that can be extracted from a section of the resulting toroidal plasma loop. A plurality of high-power microwave sources can also be used to increase the number of ions generated without increasing the power supply requirements, thereby potentially reducing cost and weight of the plasma engine.

In yet other embodiments, the plasma source 102 is a DC glow discharge plasma source, where electrons are accelerated from a cathode to anode to acquire energy. When the voltage exceeds a certain striking potential, the ionization of the gas becomes self-sustaining. The polarity of the DC glow discharge plasma source can be adjustable.

A universal problem with systems utilizing atomic hydrogen and many other atomic species is that atomic species recombines easily and quickly so it is very difficult to move atomic species from the area where atomic species is generated to an area where atomic species can be used for generating thrust or energy for a reaction. Known systems use gas transport to move atomic species. However, gas transport alone is not practical for many applications like propulsion because large quantities of gas are needed. Also, the gas pressure alone increases the probability of recombination of atomic species. Known methods have only been able to transport atomic small distances before recombination. However, even these small distances are sufficient for transporting atomic species into a reaction region according to the present teaching. See, for example, R. K, Grubbs, "Attenuation of Hydrogen Radicals Traveling Under Flowing Gas Conditions Through Tubes of Different Materials, J. Vac. Sci. Technol. A 2(3), May/June 2006, which is incorporated herein by reference.

One feature of the present teaching is the realization that there are more practical means to transport atomic species out of the plasma generation area to a desired reaction region while also reducing the probability of recombination. One realization is that atomic species can be ionized and then extracted with a simple ion extractor or with ion optics. Extraction can be accomplished with high voltages that move ions of atomic species out of the plasma generation area in much less time compared to transport with only pressurized gases to maintain a higher fraction of atomic species.

An ion extractor 104 is positioned proximate to an open port of the plasma source 102 where the plasma containing ions, including ions of atomic species, are exposed. The ion extractor 104 is positioned so that the ions of neutral and atomic species propagate out of the plasma source 102 to a desired position where they are used for generating power or thrust. The ion extractor 104 can be as simple as a structure that applies a large DC voltage between electrodes to generated an electric field that attracts ions in the plasma to an electrode. In some configurations, the DC voltage is continuous so that ions are continuously extracted from the plasma source 102.

In other configurations, the DC voltage is a pulsed DC voltage having a waveform that is periodic. The periodic waveform can be a square wave with a pulse width and a period, which is the length of time that the waveform takes to repeat itself. In these configurations, the ion extractor 104 is a pulsed ion extractor that applies a pulsed electric field to the extraction electrode or electrodes.

Typically, the pulsed electric field is applied with a periodic waveform. But, in certain methods and configurations, the pulsed electric field is applied with a non-period (aperiodic) waveform that does not repeat itself at regular intervals of time. Energizing extraction electrodes with non-periodic waveforms can be used to achieve certain results.

For example, a longitudinal wave that forms a shock wave can increase the thrust generated by the plasma engine can be produced by energizing the extraction electrode with a non-periodic waveform. In methods for generating shock waves, the non-period waveform is determined by the time is takes to create the shock wave and a relaxation time between shock waves, which is often aperiodic, changing with operating parameters and with ambient conditions. For example, the non-periodic waveform can be chosen to provide bunching of ions that form the shock wave.

Another example of using non-periodic waveforms to energize extraction electrodes is methods for adapting to changing operating conditions including changing environmental conditions. Yet another example of using non-periodic waveforms to energizes extraction electrodes improving and/or optimizing engine performance metrics during operation.

Ions are extracted only during the portion of time where the pulse is at a high potential. Rise times of the DC pulses are typically a very small fraction of the pulse width so extraction time are essentially the time of the width of the pulse. This is, at least in part, because the times scale of reactions in the plasma engines is relatively long for modern high power electronics so there is very little transition between high and low states of the pulse.

The ion extractor 104 physically includes at least one extraction electrode 104 that provides an electric field that attracts ions in the plasma thereby moving them out of the plasma generation area in the plasma source 102 and into an extraction region. Some embodiments include an electrode at the output port of the plasma source 102 that is used for ion extraction. Other embodiments include an electrode at the output port of the plasma source this is used to contain ions in the plasma source until they are extracted with an extraction electrode.

In various configurations, the extraction electrodes 104 can be an extraction ring structure or an extraction linear plate structure. The extraction electrodes can also be conically-shaped structure. The extraction electrodes can be formed in a grid pattern or can have one open area.

The extraction electrodes can be formed of numerous types of materials depending on the type of ions in use, tolerance to erosion, and serviceability requirements. For plasma engine applications, durable low maintenance electrodes are desirable. The extraction electrodes are formed of a conductive material. For example, the extraction electrodes can be formed of graphite, which has relatively low erosion rates and limited thermal expansion. Extraction grids can also be formed of molybdenum, which is a refractory metal suitable for high temperature operation. Molybdenum electrodes are sometimes shaped to control its thermal expansion. Molybdenum electrodes are sometimes shaped specifically to control an overall beam shape that is either convergent or divergent depending on the geometry of the reaction area. Extraction grids can also be formed of titanium, which is less fragile than graphite and molybdenum and easy to clean.

Some configurations use an ion optical system that includes more than one extraction electrode. In these configurations, each of the extraction electrodes can be electrically isolated so that their potential can be independently controlled. However, some configurations use multiple extraction electrodes with at least two having a common potential.

In ion optic systems with multi-extraction electrode, a first electrode can be positioned at the output port of the plasma source 102. This electrode is sometimes referred to as the innermost electrode or screen. In some configurations, the innermost electrode is biased with a positive potential that is chosen to keep the positive ions generated in the plasma contained in the ions source.

The positive ions are accelerated from the plasma source 102, through the ion optics to the reaction area which can be at near-ground potential. The ion optics includes a second electrode that is often called an accelerating electrode. The second electrode is biased negatively to extract the ions out of the plasma source 102. The negative bias is typically much less than the large positive potential applied to the innermost electrode. However, the desired negative bias applied to the accelerating electrode depends strongly on the desired beam shape and characteristics. For example, if a more collimated ion beam is desired, the negative bias will be lower than if a more divergent ion beam profile is desired.

Some configurations of the ion optics have a third electrode that can be a deceleration electrode which can also be biased negatively, usually at a different negative potential relative to the accelerating electrode. The deceleration electrode can provide focusing. The decelerating electrode can also provide some protection for the other two electrodes from material that is created during reactions that occur downstream of the ion extraction. Ion extraction systems that use three grids generally have improved ion beam stability and control. In systems where multiple electrodes are grids, the grid apertures are typically aligned. The selection of the particular aperture geometry influences that final beam shape. The third electrode can be an additional accelerating electrode that provides an addition stage of ion acceleration. Other configurations include additional electrodes that can be accelerating or decelerating electrodes to provide additional control over the ion beam.

Also, some embodiments can include a neutralizing grid positioned proximate to extraction electrodes. Neutralizing grids can be used to reduce effects of excessive charging. To achieve neutralization, there must be approximately equal numbers of electrons and positively charged ions in each volume of the ion beam. The neutralizing grid is typically energized to achieve a certain desired level of neutralization that is depended on the operating parameters and operating conditions.

An ion detector, such as a Faraday cup can be positioned proximate to the extraction electrodes to measure the ion current at one or more of the extraction electrodes. The ion detector can be used in a feedback loop to control functions of the plasma engine.

The ion extractor 104 includes at least one high voltage power source with outputs that are electrically connected to the extraction electrodes. The high voltage power supply can be a pulsed power supply that pulses the extraction electrodes with a high voltage at desired repetition rates. The repetition rate can be chosen to provide bunching of ions that results in energy production for thrust that is pulsed causing a pressure or shock wave.

In some configurations, the ion extractor also includes the use of gas injection to move the neutral and atomic species out of the plasma source 102. The gas injection can be continuous or pulsed and can be timed with electrical extraction.

In some configurations, the ion engine 100 includes a mass separator 106, such a magnetic mass separator, that separates ions in space according to their mass. A time-of-flight mass separator can also be used to spatially separate out desired ions in one dimension. Ion mirrors and/or redirecting electrodes can be used to separate ions in a spatial dimension and to direct them in desired paths. The spatial dimension can be linear in the direction of ion propagation as well as off the axis of ion acceleration. In some methods according to the present teaching, the mass separator 106 is used to separate desired ion species, such as atomic hydrogen and/or atomic helium from other species, so that a desired concentration the desired species is provided to a reaction region at a desired time to provide reactants to the reaction region.

Separating desired ion species, such as atomic hydrogen and/or atomic helium from other species also allows for more efficient recirculation of recombined species back into the plasma source. Recirculated recombined atomic species back to the ions source can greatly improve the efficiency of the ion engine 100 that can result in much greater power-to-thrust ratio and the power-to-weight ratio than known ion engines. Some configurations that separate atomic species, such as hydrogen, can be configured to maintain the concentration of atomic species to a predetermined level, such as a level that maintains the concentration below an explosive concentration.

Another feature of the present teaching is the realization that it is possible to increase the probability that atomic species extracted from the plasma source are maintained as atomic species by providing electromagnetic energy to the atomic species. In some embodiments, the ion engine 100 includes a separate energy source 108 that adds electromagnetic energy to ions and neutral species that are generated by the plasma source 102 to form additional and/or maintain atomic species to increase the lifetime of the atomic species and the probability that atomic species will be present in the reaction region.

The energy source 108 can be configured to provide electromagnetic energy at a resonant frequency of the species generated by the plasma source 102. Numerous types of energy sources can be used. One type is an electromagnetic energy source that can be an optical radiation source, such as an ultraviolet light source. In one mode of operation, the ultraviolet light source emits lights at a resonant frequency of the excited ions. The optical radiation source can also be a laser. The optical radiation source can also be a gas filed bulb. The optical radiation source can also be a laser driven light source that drives a gas filed bulb. In various other embodiments, the optical radiation source can also be an RF, microwave source, a millimeter wave source.

The ion engine 100 also includes a reaction region 110 in a housing coupled to the plasma source where ions and neutrals of atomic species recombine to generate heat that is used for thrust. The reaction region can include a structure with surfaces designed to promote recombination of atomic species to neutral species, while allowing heat to transport escape to generate thrust. For example, such a structure can be textured or be formed with shapes, such as chevrons, that increase the probability that atomic species reacts on contact. Hydrogen and other ions recombine with electrons at surfaces through diffusion according to Langevin's theory of ionic mobility. In addition, hydrogen atoms are recombined at these structures to form hydrogen molecules that can be recycled back to the plasma source. The recombination efficiency increases with temperature so that when a reaction occurs that generates heat, remaining atomic species are likely to recombine.

In some configurations, the reaction chamber 110 rotates relative to the housing of the ion engine 100. This configuration allows a higher rate of pulsed detonations. In one particular configuration, the reaction chamber 110 comprises a plurality of reaction chambers where each of the plurality of reaction chamber is alternatively used for combustion or pulsed detonation. In some configurations, more than one of the reaction chambers can be used for combustion or pulsed detonation simultaneously. This configuration allows time for recycling of recombined molecular species in a recently combusted or detonated chamber before the next introduction of atomic species and subsequent combustion or detonation. In addition, this configuration also allows for time to cool the recently combusted or detonated chamber.

The operation of the plasma engine recombination can be in pulses so as to create bunching that forms longitudinal waves, which can be in the form of a significant pressure wave that can be a shock wave. Energy generated by the recombination can be used to create steam for thrust. In many configurations, the related energy is used to increase the efficiency of the ion engine 100 and, in particular, the thrust-to-power ratio of the ion engine 100 making it more suitable for human transportation.

Another aspect of the present teaching is the realization that recombined species in molecular form, which have released heat, can be recycled back to the plasma source where they can be used again. In some configurations, the plasma engine 100 includes molecular species recycling system. The molecular species can be in the reaction region can be isolated in space and/or time (for time-of-flight configurations) so that recombined molecular species can be recirculated back to the plasma source 102 where they can be reused. Various means can be used to recycle gases, such as a structure that uses the Venturi effect. The recirculation of the molecular species can greatly improve the efficiency of the engine and the engine's power-to-thrust ratio. The method of recirculating combined molecular species according to the present teaching can also be used in conventional engines, such as internal combustion engines and in rotary engines.

The position of the recombination region in the reaction chamber 110 relative to the plasma generator 102 can be determined based on a recombination time and based on an accelerating voltage in the ion extraction region of the ion extractor 104. At least some of the ions generated by the plasma source 102 that are in excited states recombine to their ground state releasing energy creating heat for thrust. In some configurations, the heat is used to create steam that powers a turbine or other device that is used to self-power an energy source in the ion engine that adds energy to ions passing through the ion extraction region.

Figure 2:
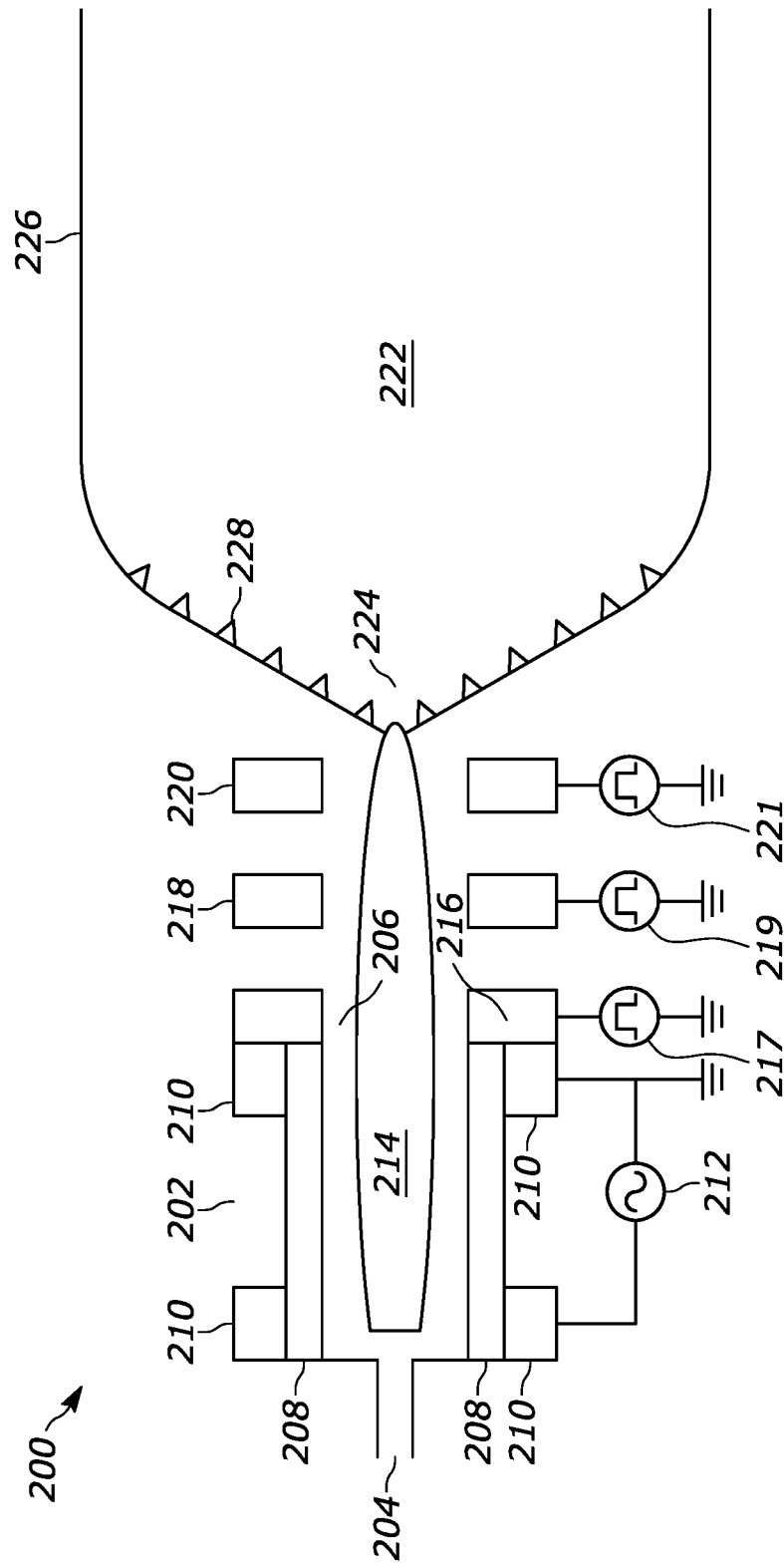
FIG. 2 illustrates a schematic diagram of one embodiment of a multi-stage plasma engine that uses a dielectric barrier discharge ion source according to the present teaching.

FIG. 2 illustrates a schematic diagram of one embodiment of a multi-stage plasma engine 200 that uses a dielectric barrier discharge ion source 202 according to the present teaching. The plasma engine 200 includes a gas inlet 204 for receiving one or more types of molecular species. In some configuration, an inert gas can also be introduced into the gas inlet 204. Some configurations also have multiple gas inlets. This particular plasma engine is designed to operate at atmospheric pressure and at positive pressures.

The plasma engine 200 includes the dielectric barrier discharge plasma source 202 coupled to the gas inlet 204 with an output port 206 that passes ionized species. In the configuration shown, the dielectric barrier discharge plasma source 202 includes a dielectric barrier tube 208. In the configuration shown, the plasma source 202 is configured with a pair of ring electrodes 210 coupled to an RF or pulsed DC power source 212 that generates a plasma 214 within the dielectric tube 208 that can extend out of the dielectric barrier tube 208. See, Teschke, Kedzierski, Finantu-Dinu, Korzec and Engemann, 2005 IEEE Trans. Plasma Sci. 33 310. In some methods, the RF frequency is in the kHz range. In other methods the RF frequency is 13.56 MHz. It should be understood that there are many possible electrode configurations that can be used to create a dielectric barrier discharge and that the pair of ring electrodes 210 shown in FIG. 2 is one simple example. It should further be understood that many other types of power sources can be used including pulsed DC and microwave power sources. In some configurations according to the present teaching a magnetic field is used to increase the plasma density and lifetime of atomic species in the plasma source 202.

In one embodiment, the plasma source 202 is a plasma jet-type plasma source that injects feed gas at a high enough pressure so that a portion of the plasma 214 extends beyond the output port of the plasma source 202 into a housing. These plasma jet-type plasma sources can use pulsed or continuous injection of gases to extend the plasma 214 beyond the output port 206 of the plasma source 202. See, for example, J. Winter, et al., "Atmospheric Pressure Plasma Jets: an Overview of Devices and New Directions", which is incorporated herein by reference. Also, see M. Teschke, et al., High-Speed Photographs of a Dielectric Barrier Atmospheric Pressure Plasma Jet, IEEE Transactions On Plasma Science, Vol. 33, No. 2, April 2005, which is incorporated herein by reference.

In some configurations, a carrier gas can be used to form a type of "gas sheath" that protects the atomic species (including the non-ionized atomic species) from contacting a surface and causing recombination back to molecular species until the atomic species reaches the desired reaction region. This can be performed by including an outer gas ring for the carrier gas as known in the art.

The output 206 of the plasma source 202 can include a first electrode 216 positioned directly on the end of the dielectric tube 208. The first electrode 216 can be biased with a first power supply 217 to keep ions generated in the plasma source until an extraction electrode extracts the ions out of the plasma source 202 at a desired time. Alternatively, the first electrode 216 can be biased with the power supply 217 to attract ions in the plasma source 202 thereby extracting the ions generated in the plasma out of the plasma source 202. In any of these configurations, the first electrode 216 can be biased in a pulsed or continuous DC mode of operation.

A second electrode 218 is positioned adjacent to the first electrode 216 in the direction of ion propagation out of the plasma source 202. In some configurations according to the present teaching, the second electrode 218 is an accelerating electrode that is configured to attract ions generated in the plasma source 202 into a housing where atomic species can recombine into molecular species and/or react with other gases to generate thrust. The second electrode 218 can be biased with a power supply 219 in a pulsed or continuous mode of operation and can be electrically isolated from the first electrode 216.

A third electrode 220 can be positioned adjacent to the second electrode 218 in the direction of ion propagation out of the plasma source 202. The third electrode 220 can be configured is several different ways. In some methods, the third electrode 220 is configured to provide an additional stage of acceleration. In other methods, the third electrode 220 is configured as a decelerating electrode that can be used to shape the ion beam generated by the plasma source 202. In any of these configurations, the third electrode 220 can be biased with a power supply 221 in a pulsed or continuous mode of operation and can be electrically isolated from the first 216 and second electrode 218. It should be understood that only one electrode is needed to perform continuous or pulsed ion extraction.

A reaction region 222 is positioned after the third electrode 220, or the last electrode in embodiments without a third electrode 220, in the direction of ion propagation away from the output port 206 of the plasma source 202, which can be the first 216, second 218 or third electrode 220 depending on how many electrodes are used in the configuration. The reaction region 222 includes an inlet 224 that opens to a larger area in a housing 226. The reaction region 222 can include structures 228 positioned at boundaries of the reaction region 222 to increase surface area per unit length in order to increase the probability of that atomic hydrogen will recombine. For example, in one configuration, the structures 228 positioned to increase surface area per unit length are chevron-shaped structures as shown. However, it should be understood that there are many other structures as well as textured surfaces that can increase surface area per unit length. Also, in some embodiments, such structures 228 that increase surface area per unit length can be positioned offset from the boundaries of the reaction region 222.

The reaction region 222 is a region where atomic species ions and molecules recombine into molecular species to generate heat for combustion to create thrust. In various methods according to the present teaching, additional gases or solid materials in particle or bulk form can be injected into the reaction region 222 so that when heat is generated by the recombination of atomic species into molecular species additional thrust is created. In one particular method, hydrogen gas is used as the molecular species gas and is injected in the inlet 204 in the plasma source 202 to generate a plasma with at least three types of hydrogen ions are generated $H^+$, $H_2^+$ and $H_3^+$.

Figure 3:
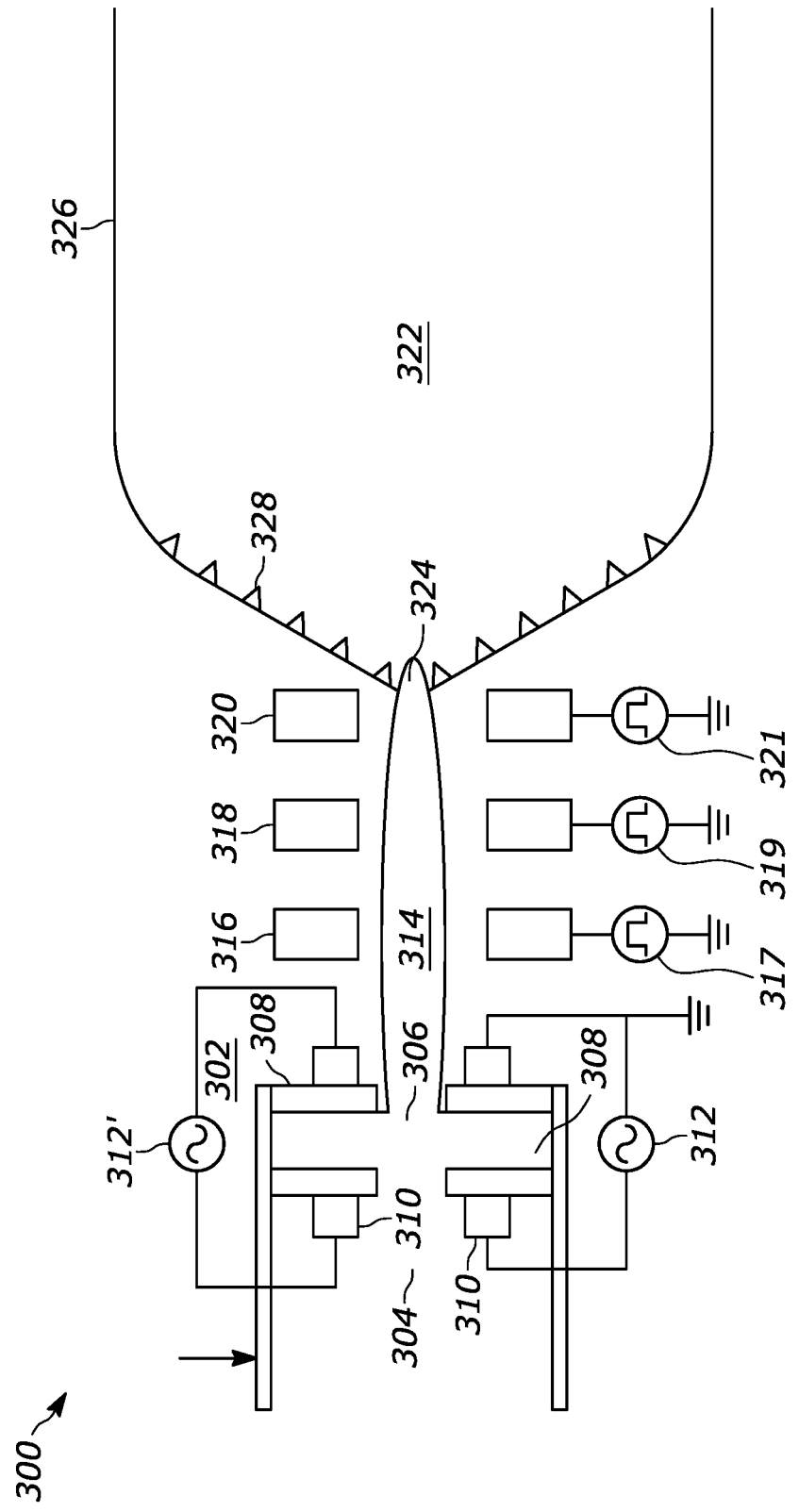
FIG. 3 illustrates a schematic diagram of another embodiment of a multi-stage plasma engine that uses a dielectric barrier discharge ion source according to the present teaching.

FIG. 3 illustrates a schematic diagram of another embodiment of a multi-stage plasma engine 300 that uses a dielectric barrier discharge ion source 302 according to the present teaching. The plasma engine 300 includes a gas inlet 304 for receiving one or more types of molecular species. Inert gases can also be introduced into the gas inlet 304. Some configurations also have multiple gas inlets. This particular plasma engine is also designed to operate at atmospheric pressure and at positive pressures.

The plasma engine 300 includes the dielectric barrier discharge plasma source 302 coupled to the gas inlet 304 and an output port 306 that passes ionized species. In the configuration shown, the dielectric barrier discharge plasma source 302 includes two centrally perforated dielectric disks 308. See, Laroussi and Lu, 2005 Appl. Phys. Lett. 87 113902. This configuration is relatively compact and can generate a relatively long plasma jet into reactions regions that can be several centimeters away from the output port of the plasma source. See, Laroussi and Lu, 2005 Appl. Phys. Lett. 87 113902.

In the configuration shown, the plasma source 302 is configured with a pair of ring electrodes 310 coupled to RF or pulsed DC power sources 312, 312', which can be the same power supply, that generates a plasma 314 within the dielectric tube 208 that can extend out of the two centrally perforated dielectric disks 308. It should be understood that many other types of power sources can be used including DC discharge and microwave power sources. In some configurations according to the present teaching a magnetic field is used to increase the plasma density and lifetime of atomic species in the plasma source 302.

In one embodiment, the plasma source 302 is a plasma jet-type plasma source that injects feed gas at a high enough pressure so that a portion of the plasma 314 extends beyond the output port of the plasma source 302 into a housing. These plasma jet-type plasma sources can use pulsed or continuous injection of gases to extend the plasma 314 beyond the output port 306 of the plasma source 302.

A first electrode 316 can be positioned proximate to the output port 306. The first electrode 316 can be biased to keep ions generated in the plasma source until an extraction electrode extracts the ions out of the plasma source 302 at a desired time. Alternatively, the first electrode 316 can be biased to attract ions in the plasma source 302 thereby extracting the ions generated in the plasma out of the plasma source 302. In any of these configurations, the first electrode 316 can be biased with a power supply 317 in a pulsed or continuous DC mode of operation.

A second electrode 318 is positioned adjacent to the first electrode 316 in the direction of ion propagation out of the plasma source 302. In some configurations according to the present teaching, the second electrode 318 is an accelerating electrode that is configured to attract ions generated in the plasma source 302 into a housing where atomic species can recombine into molecular species and/or react with other gases to generate thrust. The second electrode 318 can be biased with a power supply 319 in a pulsed or continuous mode of operation and can be electrically isolated from the first electrode 316.

A third electrode 320 can be positioned adjacent to the second electrode 318 in the direction of ion propagation out of the plasma source 302. As described in connection with FIG. 2, the third electrode 220 can be configured is several different ways. In some methods, the third electrode 320 is configured to provide an additional stage of acceleration. In other methods, the third electrode 320 is configured as a decelerating electrode that can be used to shape the ion beam generated by the plasma source 302. In any of these configurations, the third electrode 320 can be biased by a power supply 321 in a pulsed or continuous mode of operation and can be electrically isolated from the first 316 and second electrode 318. Like the embodiment shown in FIG. 2, it should be understood that only one electrode is needed to perform continuous or pulsed ion extraction.

A reaction region 322 is positioned after the third electrode 320, or the last electrode in embodiments without a third electrode 320, in the direction of ion propagation away from the output port 306 of the plasma source 202, which can be the first 316, second 318 or third electrode 320 depending on how many electrodes are used in the configuration. The reaction region 322 includes an inlet 324 that opens to a larger area in a housing 326. The reaction region 322 can include structures 328 positioned at boundaries of the reaction region 322 to increase surface area per unit length in order to increase the probability of that atomic hydrogen will recombine. For example, in one configuration, the structures 328 positioned to increase surface area per unit length are chevron-shaped structures as shown. However, it should be understood that there are many other structures as well as textured surfaces that can increase surface area per unit length. Also, in some embodiments, such structures 328 that increase surface area per unit length can be positioned offset from the boundaries of the reaction region 322.

As described in connection with the embodiment of FIG. 2, the reaction region 322 is a region where atomic species ions and molecules recombine into molecular species to generate heat for combustion to create thrust. In various methods according to the present teaching, additional gases or solid materials in particle or bulk form can be injected into the reaction region 322 so that when heat is generated by the recombination of atomic species into molecular species additional thrust is created. In one particular method, hydrogen gas is used as the molecular species gas and is injected in the inlet 304 in the plasma source 302 to generate a plasma with at least three types of hydrogen ions are generated $H^+$, $H_2^+$ and $H_3^+$.

Importantly, the power generated by the plasma engine of the present teaching is not limited by either ion production or by space charge density like known EAD and ion engines and still provides a means to generate propulsive forces in fluids without any moving parts. The high thrust-to-power ratio of the ion engine according to the present teaching have the potential to be useful for practical human flight. In particular, the plasma engine according to the present teaching is useful as a rocket engine because of its ability to operate efficiently over a very wide atmospheric pressure range.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A plasma engine comprising:
   a) a plasma source having a gas input coupled to a source of first molecular gas species comprising at least one of hydrogen or helium and an output port, the plasma source generating ions from the received first molecular gas species;
   b) an ion extractor positioned proximate to the output port of the plasma source and configured to extract ions from the plasma source with an electric field; and
   c) a housing comprising a region that receives ions extracted from the ion extractor, wherein at least some of the extracted ions react with a second molecular gas species present in the housing to generate energy.

2. The plasma engine of claim 1 wherein the plasma source comprises a dielectric barrier discharge plasma source.

3. The plasma engine of claim 2 wherein the dielectric barrier discharge plasma source comprises an asymmetrical electrode configuration.

4. The plasma engine of claim 1 wherein the plasma source comprises a non-thermal plasma source.

5. The plasma engine of claim 1 wherein the plasma source is configured to operate at atmospheric pressure.

6. The plasma engine of claim 1 wherein the plasma source is configured to operate at higher than atmospheric pressure.

7. The plasma engine of claim 1 wherein the plasma source is configured as an array of plasma sources.

8. The plasma engine of claim 1 wherein the output port of the plasma source comprises an electrode of the ion extractor.

9. The plasma engine of claim 8 wherein the electrode comprising the output port of the plasma source is configured to extract ions out of the plasma source.

10. The plasma engine of claim 8 wherein the electrode comprising the output port of the plasma source is configured to repel ions from the output port back into the plasma source.

11. The plasma engine of claim 1 wherein the ion extractor comprises an ion accelerating electrode that is configured to attract ions in the ion source, thereby moving ions out of the ion source and into the recombination region.

12. The plasma engine of claim 11 wherein the ion accelerating electrode comprises a grid.

13. The plasma engine of claim 11 wherein the ion accelerating electrode comprises at least one of a plate, linear structure, conical structure, or a ring.

14. The plasma engine of claim 1 wherein the ion extractor comprises a decelerating electrode positioned after the ion accelerating electrode in a direction of propagation of the extracted ions, the decelerating electrode being configured to shape the extracted ions distribution.

15. The plasma engine of claim 1 wherein the ion extractor comprises a pulsed ion extractor.

16. The plasma engine of claim 1 wherein the generated energy is used for a reaction.

17. The plasma engine of claim 1 wherein the generated energy is heat used for combustion.

18. The plasma engine of claim 1 wherein the generated energy is heat used to form steam to power a turbine.

19. The plasma engine of claim 1 wherein the generated energy creates thrust.

20. A method for generating energy for use in an engine, the method comprising:
   a) providing a first molecular gas species comprising at least one of hydrogen or helium to a plasma source;
   b) generating ions in the plasma source from the first molecular gas species;
   c) extracting the generated ions from the plasma source with an electric field; and
   d) reacting the extracted ions with a second molecular gas species to generate energy for use in an engine.

21. The method of claim 20 wherein the second molecular gas species is air.

22. The method of claim 20 wherein the second molecular gas species is oxygen.

23. The method of claim 20 wherein the extracting the generated ions comprises pulsed extraction.

24. The method of claim 20 further comprising generating the electric field that extracts the generated ions from the plasma source with a waveform that generates a longitudinal wave in the thrust.

25. The method of claim 24 wherein the longitudinal wave is a shock wave.

26. The method of claim 20 wherein the generating the ions in the plasma source comprises generating ions in a dielectric barrier ion source.

27. The method of claim 20 wherein the extracting the generated ions from the plasma source with an electric field comprises accelerating the ions and then decelerating the ions to form an ion beam.

28. The method of claim 20 wherein the extracting the generated ions from the plasma source with an electric field comprises accelerating the ions and then decelerating the ions to shape a resulting ion beam.

29. The method of claim 20 wherein the generated energy is used fora reaction.

30. The method of claim 20 wherein the generated energy is heat used for combustion.

31. The method of claim 20 wherein the generated energy is heat used to form steam to power a turbine.

32. The method of claim 20 wherein the generated energy creates thrust.

* * * * *